April 2, 1957 — R. I. BECK — 2,787,364
AUTOMATIC SELF-FILLING CONVEYOR
Filed Nov. 20, 1952 — 4 Sheets-Sheet 1
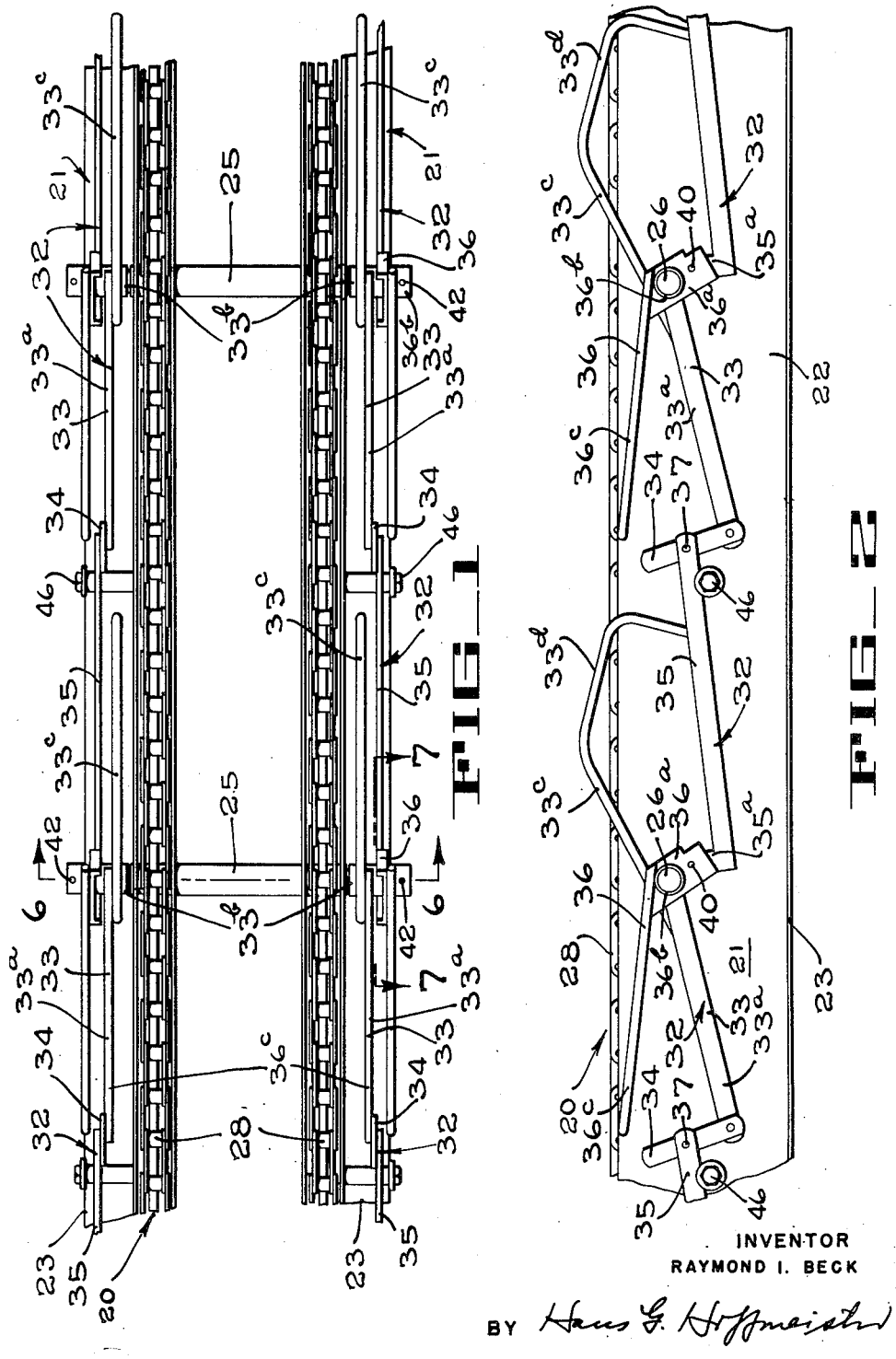
INVENTOR
RAYMOND I. BECK
BY Hans G. Hoffmeister
ATTORNEY

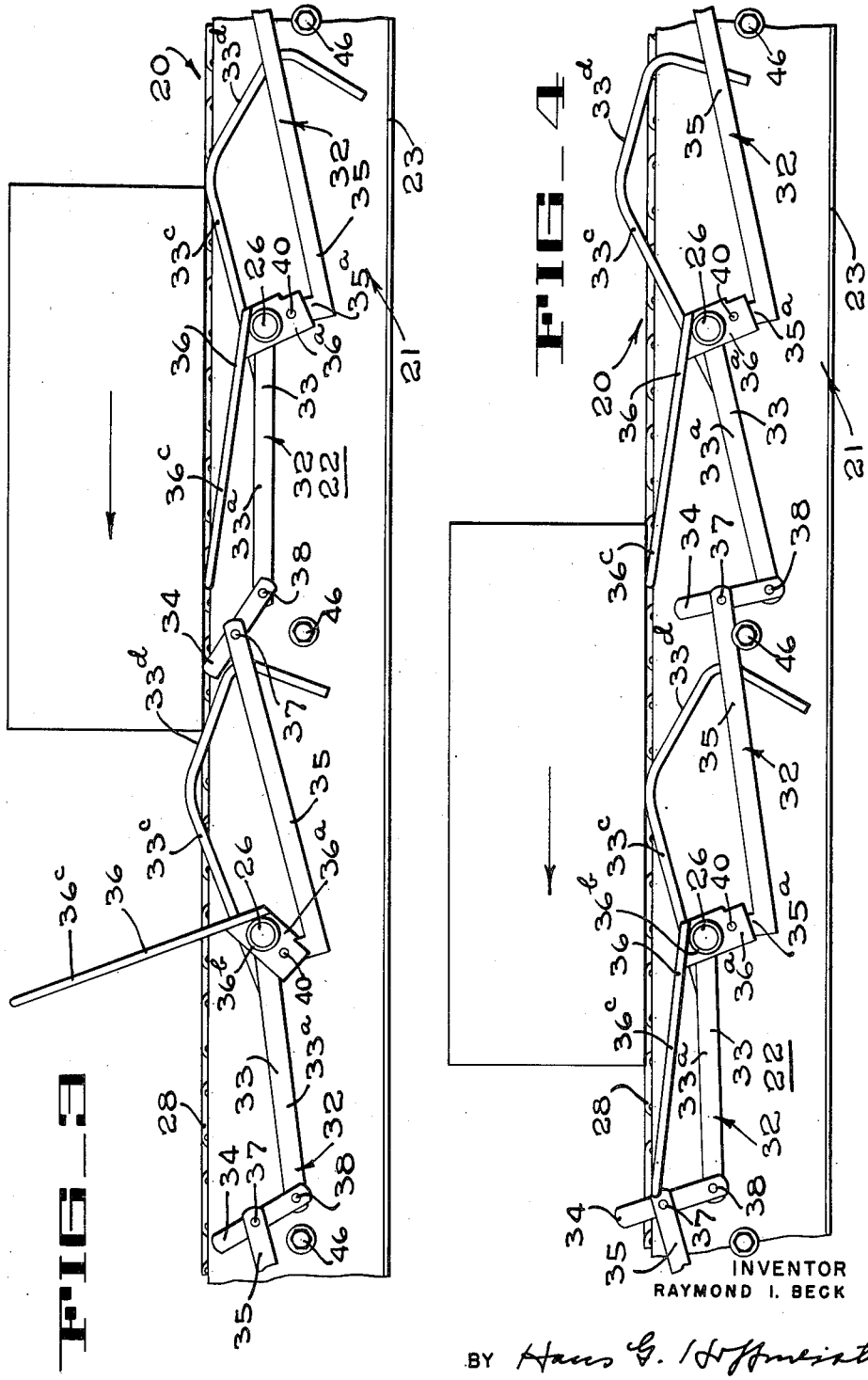

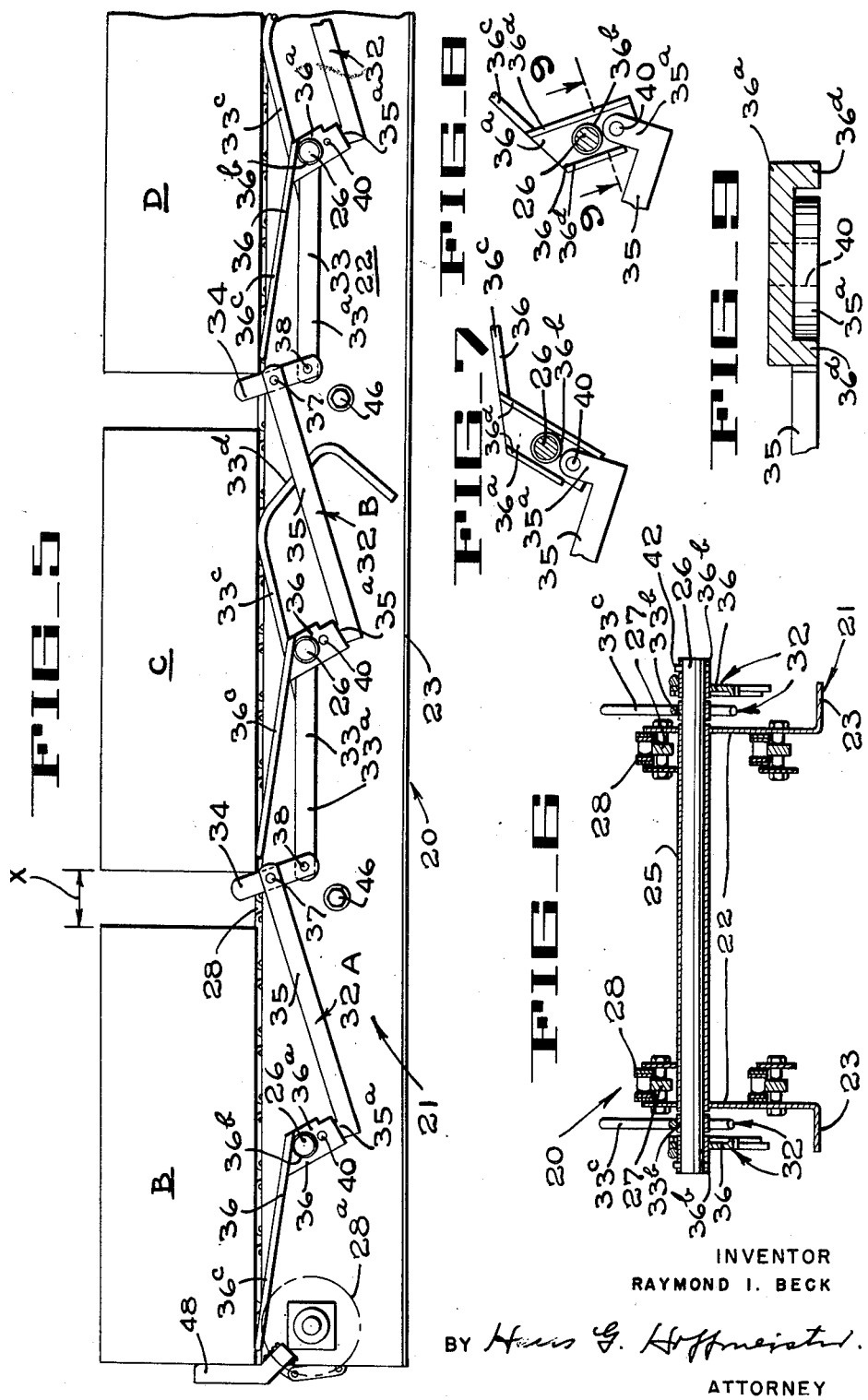

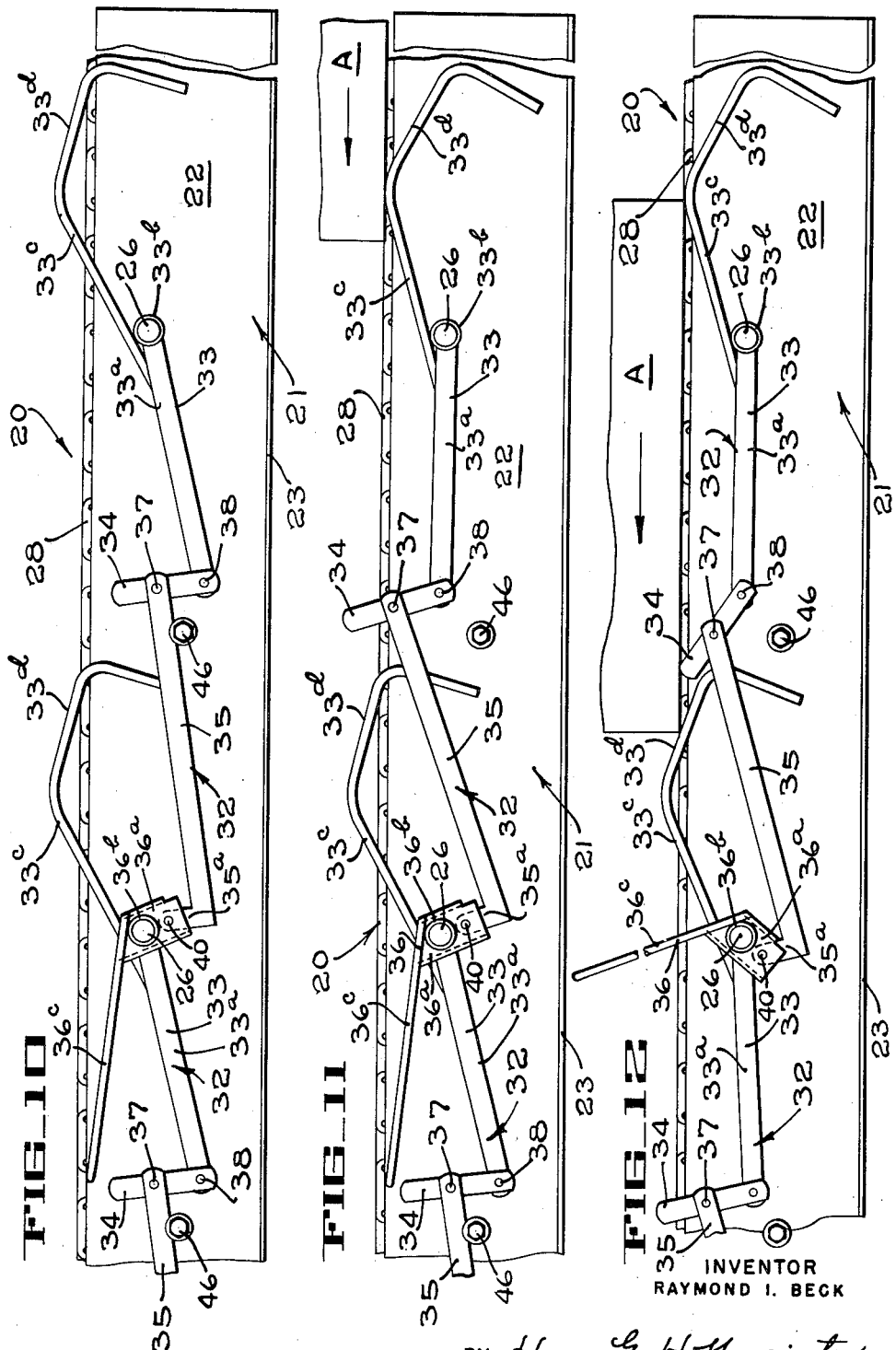

United States Patent Office 2,787,364
Patented Apr. 2, 1957

2,787,364
AUTOMATIC SELF-FILLING CONVEYOR

Raymond I. Beck, Hawthorne, Calif., assignor to Food Machinery and Chemical Corporation, San Jose, Calif., a corporation of Delaware Application November 20, 1952, Serial No. 321,645

20 Claims. (Cl. 198—34)

The present application is a continuation-in-part of my co-pending application for Automatic Self-Filling Box Spacing Conveyor, Ser. No. 106,609, filed July 25, 1949 and now abandoned.

This invention appertains to conveyors for delivering articles to predetermined stations.

More particularly, the present invention relates to an improved conveyor arranged to advance articles to spaced sections of the conveyor and to automatically refill each section when an article is removed therefrom.

A conveyor of this type is especially useful in the fruit packing industry for positioning a supply of boxes at packing stations located alongside the conveyor and for automatically replenishing said supply upon removal of boxes from the conveyor.

One object of the present invention is to provide a conveyor for arranging a plurality of boxes or the like in close, spaced relation thereon.

Another object is to provide a conveyor adapted to automatically maintain a continuous supply of boxes at spaced stations thereof.

A further object is to provide an automatically operating stop mechanism for a box supplying and spacing conveyor which is adapted to stop the forward movement of an advancing box in response to the forward movement of the box.

A still further object is to provide a conveyor stop actuating mechanism which may be conditioned for actuation by a first box and moved into stopping position by a following box.

Another object is to provide a mechanism for controlling the raising and lowering of a stop in front of boxes moving along a conveyor wherein the pressure of an advancing box tending to override the stop is resisted by the weight of a preceding box and the advancing box.

Other and further objects and advantages of the present invention will become apparent from the following description and accompanying drawings, in which:

Fig. 1 is a plan view of a section of a conveyor provided with a stop mechanism constructed in accordance with the teaching of the present invention.

Fig. 2 is a side elevation of the mechanism shown in Fig. 1.

Fig. 3 is a view similar to Fig. 2 showing a box actuating the stop mechanism as the box advances along the conveyor.

Fig. 4 is a view similar to Fig. 3 but showing a more advanced position of the box on the conveyor.

Fig. 5 is a side elevation of the mechanism of Fig. 1 illustrating a series of boxes resting on the forward or downstream end of the conveyor and held in stationary spaced relation thereon by the mechanism of the present invention.

Fig. 6 is a transverse section taken along line 6—6 of Fig. 1.

Fig. 7 is an enlarged fragmentary section taken along line 7—7 of Fig. 1.

Fig. 8 is a view similar to Fig. 7 but disclosing a second operational position of the elements shown.

Fig. 9 is an enlarged section taken along line 9—9 of Fig. 8.

Figs. 10, 11 and 12 are a series of side elevations of the loading end of the conveyor of Fig. 1 illustrating the various operational positions of the stop actuating mechanism as a box is advanced on the conveyor.

In Figs. 1 and 6, reference numeral 20 indicates generally a conveyor having a frame 21 comprising two vertically disposed, spaced metal plates 22 which are bent at their lower edge to provide horizontally extending support flanges 23. The spaced plates 22 are joined by tubes 25 welded thereto and extending through holes in said plates. A shaft 26 is rotatably journalled in each tube 25 extending a slight distance beyond each side plate as shown in Fig. 6. Mounted on opposite sides of the frame (Figs. 1 and 6) are parallel chain support tracks 27 on which two endless conveyor chains 28 are supported and guided for movement longitudinally of the frame. The chains are trained around sprockets 28a (one of which being shown in Fig. 5) and are driven in the usual manner by power driven sprockets (not shown) which are disposed at convenient locations along the conveyor frame. Thus, boxes disposed on the conveyor chains 28 are advanced along the conveyor 20 riding on said chains, as long as their advance is not obstructed. When the advance of any box is halted, the chains continue to move, sliding against the bottom of the box. When the obstruction to the advance of the box is removed, the box thereupon resumes its advance along the conveyor on said chains.

The distance that each box is spaced from the next ahead box when the boxes come to rest, as seen in Fig. 5, is determined by the spacing of the transverse tubes 25. The tubes are disposed at equally spaced intervals along the conveyor frame, each interval being equal to the length of one of the boxes plus the distance "X", Fig. 5, which is the desired spacing between adjacent boxes in the at rest position.

Identical stop actuating mechanisms are mounted on each side of the conveyor frame, with identical parts directly across from each other. Each stop actuating mechanism comprises a series of identical, recurring and overlapping units 32 which are actuated consecutively to raise a stop in front of each box as it advances. Referring to Fig. 10, it will be seen that each unit 32 comprises a stop lifter lever 33, a stop bar 34, a link 35 and a bellcrank 36. The stop lifter lever 33 comprises a rigid metal strap member 33a on the end of which is welded a tubular hub 33b. The hub is pivotally mounted on one of the shafts 26 which extends a short distance outwardly from either side of the associated tube 25. A rigid cam arm 33c is also secured to the strap 33a extending above and to the opposite side of the hub 33b. The cam arm 33c is preferably in the form of a hardened steel rod which extends upwardly and then downwardly to offer a camming surface 33d to a box advancing from right to left as seen in Fig. 10. The stop bar 34 is a rigid metal bar pivotally connected at one end by a pin 38 to one end of the lifter lever 33 and pivotally connected intermediate its length at 37 to one end of the link 35. At its opposite end the link 35 (Fig. 7) has an upwardly extending arm 35a pivotally connected by a pin 40 to the bellcrank 36. The bellcrank 36 (Fig. 10) comprises a flat upright plate 36a to which the link 35 is pivoted and on which a hub 36b is integrally formed. The hub 36b is keyed by a pin 42 (Fig. 6) to its supporting shaft 26. A stop setting finger 36c is welded to one side face of the plate 36a and to the hub 36b. The plate 36a (Figs. 7, 8 and 9) has spaced flanges 36d extending outwardly from its side face on the side at which the link 35 is pivotally attached. These flanges restrict the free pivotal movement of the link 35 relative to the plate 36a to a predetermined angular range. The two extremes of the pivotal movement are illustrated in Figs. 7 and 8. The positions of the arm 35a of the link 35 relative to the flanges 36d during operation of the stop actuating mechanism are shown in Figs. 10, 11 and 12.

Horizontally disposed studs 46 extend outwardly from each frame member to provide rests on which the center of each unit 32 and in particular the link 35, rests when the unit 32 is permitted to drop downwardly as seen in Fig. 10. A permanent stop 48 (Fig. 5) is provided at the downstream end of the conveyor. This stop 48 consists of one or more upright bars that are welded to the side frame members 22 of the conveyor.

The conveyor 20 of the present invention is adapted for handling articles of a wide variety such as filled boxes, empty boxes, trays, slabs of lumber, sheets of metal and the like. As previously pointed out it is particularly adapted to advance a line of articles to fixed stationary positions, each article being opposite a work station. When the article is removed from the conveyor by the worker at any station, the empty space will be automatically filled by the conveyor. Since the illustrated embodiment of the conveyor was designed to be used for delivering loaded boxes to work stations at which they are laterally removed, the operation of the conveyor for this type of installation will be described. The use of the term "box" in the claims, however, is to be considered a generic use including all articles having similar characteristics.

The loading end of the conveyor is illustrated in Figs. 10, 11 and 12. It is to be noted in Fig. 10 that, with no box on the conveyor chains, the stop actuating unit 32 is completely relaxed with the link 35 resting on a stud 46 and holding the stop bar 34 in an upright position. When a box A is placed on the conveyor chains, it is advanced into contact with the camming surface 33d (Fig. 11) causing the stop lifter lever 33 to be pivoted in a clockwise direction about the shaft 26. As the lever pivots, the stop bar 34 is raised upwardly to a position with its upper end extending into the path of travel of the box A, as shown in Fig. 11. It is to be noted that, in its upward movement, the intermediate portion of the stop bar, at pivot pin 37, moves in a circular path about the pin 40 as center. Thus, the bellcrank 36, through the pivot pin 40 and the link 35 holds or "sets" the stop bar in an upright position when the unit is in the relaxed position of Fig. 10 and guides it substantially vertically upwardly when the lifter lever 33 moves the bar upwardly. As the box A (Fig. 11) continues its forward movement, it contacts the upper end of the stop bar 34 and exerts a pressure thereagainst tending to pivot the bar counterclockwise about the pivot point 38. If, as illustrated in Figs. 10 and 11, no box is resting at the station above the setting finger 36c of the bellcrank 36, the pressure of the advancing box A will meet with no resistance and the stop bar 34 will be pivoted counterclockwise to a collapsed position, as shown in Fig. 12. This pivoting movement of the stop bar moves the link 35 to the left causing the bellcrank 36 to pivot clockwise and move the setting finger 36c to a substantially upright position (Fig. 12).

Referring to Fig. 5, it will be evident that when the box C contacts the stop bar 34 of unit 32A, which it has raised into position in front of it, the weight of the box B on the setting finger 36c permits only a limited clockwise pivoting of the bellcrank 36, to the point where the setting finger 36c contacts the bottom of the box B. Thereafter, the bellcrank 36 and the link 35 act as a rigid link and prevent the collapse of the stop bar 34. Obviously, if the box B is removed by the operator at the adjoining work station, the stop bar 34 in front of box C pivots to a collapsed position under the pressure of the box C thereagainst so that box C is permitted to move into the space just vacated by the box B. As soon as the forwardly advancing box C moves off the setting finger 36c of the unit 32B next behind, the box D will push its stop 34 to collapsed position and advance to take the former position of box C.

Referring again to Fig. 5 with the boxes B, C and D in the indicated positions, if the box C is removed two units are effected. Lifting of the box C from the cam 33c causes the forward unit 32A to drop to the relaxed position of Fig. 10. Also, removal of the box C (Fig. 5) from the setting finger 36c of unit 32B permits the bellcrank 36 to pivot clockwise. Since the box D is being continuously urged forward by the conveyor chain the stop bar 34 of the unit 32B will be collapsed and the box D will move forward.

From the foregoing description it will be noted that a box advancing into a stop actuating unit will always pivot the stop bar 34 of that unit upwardly into its path. Whether or not the stop bar 34 acts as a permanent obstruction depends upon the presence or absence of a box on the setting finger 36c of the same unit. Further, it should be noted that the bellcrank 36 will act to hold the stop bar in its upright, "set" position either when the unit is in the relaxed position shown in Fig. 10 or in the loaded position shown in Fig. 5.

Since this arrangement assures the substantially vertical movement of the stop bar, the distance X between units at rest on the loaded conveyor may be kept at a minimum. Accordingly, more work stations can be established for a given length of conveyor than would be possible if a stop bar were used which could not be brought up close behind each box.

Referring to Fig. 5, it will be particularly noted that the tendency of the box C to pivot the stop member 34 out of its path is resisted, not only by the weight of the preceding box B acting through the bellcrank 36 and the link 35, but also by the weight of the box C itself acting upon the cam arm 33 when the box is in contact with the stop 34. With this arrangement, the pressure on the stop 34 due to the weight of the advancing box is substantially counteracted by the upward pressure on the stop 34 due to the weight of the box acting through the lever 33. As a result, the box C will not override the stop 34 until the box B is removed.

Since duplicate sets of stop actuating units are mounted on both sides of the conveyor, the leading edge of a box that becomes cocked or moved out of longitudinal alignment with the conveyor will be temporarily held at one side of the conveyor while the leading edge at the other side of the box catches up. Thus, a misaligned box will be automatically squared with the conveyor.

While the illustrated embodiment of the present invention features duplicate sets of stop actuating units on opposite sides of the conveyor, it will be evident after reading the foregoing disclosure that a single line of stop actuating units, mounted substantially centrally between the side plates of the conveyor frame would operate to control the stop bars in exactly the same manner. In such an illustration, the stop bar would be provided with a box contacting surface sufficiently broad to prevent the formation of a pivot point about which the boxes may tend to rotate.

It will be understood that modifications and variations may be made without departing from the scope of the present invention.

Having thus described my invention what I claim as new and desire to protect by Letters Patent is:

1. In combination: a frame; means on said frame for supporting and propelling boxes along said frame: a series of shafts disposed transversely of said frame and rotatably mounted thereon at spaced intervals, each of said intervals being equal to the length of one of said boxes plus the desired spacing between boxes; stop lifter levers pivotally mounted on opposite ends of said shafts, each of said levers including a forwardly extending stop supporting arm and a rearwardly upwardly, and downwardly extending cam arm; stops pivotally mounted on the forward ends of said stop supporting arms and extending upwardly therefrom; stop setter bell cranks fixed on opposite ends of said shafts, each of said bell cranks including a stop setter finger adapted to be engaged by one of said boxes and a relatively short link actuating arm; and links pivotally connected to said link actuating arms and to said stops whereby engagement of a pair of said cam arms by an advancing box lifts the pair of stops immediately in advance of said box, whereby said stops are thus lifted in erect position to stop said box if the pair of stop setter fingers mounted on the next shaft in advance of said box is at that time depressed by another box, and whereby, in case said pair of stop setter fingers aforesaid is not depressed by another such box, the bell cranks of which said stop fingers are a part, are free to rotate with the shaft on which they are mounted to permit said pair of stops to yield before the first mentioned advancing box whereby the latter continues to advance under the propulsion of said box supporting and propelling means.

2. A combination as in claim 1 in which the pivotal connections between said bell crank actuating arms and links are of the knuckle type whereby the relative rotation between said arms and said links is limited, this limitation preventing successive rotation of said shafts.

3. In a conveyor, the combination of: a frame; means on said frame for supporting and propelling boxes along said frame; a series of pair of stops mounted on said frame at spaced intervals therealong, each of said pairs of stops being shiftable in front of the front end of a box advancing along said conveyor, each of said intervals being equal to the length of one of said boxes plus a relatively short distance which it is desired to space adjacent boxes on said conveyor, the stops of each pair being spaced apart so as to be located near opposite edges of a box traveling on said conveyor; a pair of correspondingly spaced stop lifters disposed for engagement by the front end of a box advancing into the interval immediately preceding each of said pairs of stops, each lifter of said pair of lifters being independently responsive to such engagement to lift the corresponding stop of said pair of stops in front of said box; a stop setter disposed for engagement by a box occupying the interval following each of said pairs of stops, said setter being responsive to such engagement to hold the stops of the immediately preceding pair in erect position so that when said stops are lifted by an advancing box as aforesaid they will halt said box, said setter, when not engaged by a box, releasing said stops to render the latter inoperative to halt said advancing box, whereby said box continues to advance, the box engaging portions of said stop lifters being disposed in the initial half of each interval, and the box engaging portions of said setter being disposed in the final half of each interval, whereby a single box overlying a pair of stops cannot engage and actuate simultaneously the lifters and the setter for said pair of stops.

4. In a conveyor, the combination of: a frame; means on said frame for supporting and propelling boxes along said frame; a series of stops mounted on said frame at spaced intervals therealong, each of said stops being shiftable in front of the front end of a box advancing along said conveyor, each of said intervals being equal to the length of one of said boxes plus a relatively short distance which it is desired to space adjacent boxes on said conveyor; and first and second coordinate devices associated with each of said stops for interposing said stop in front of and halting a box advancing along said conveyor, said first device having a box engaging portion disposed in the initial half of the interval immediately preceding said stop, said second device having a box engaging portion disposed in the final half of the interval immediately following said stop, said devices being coordinately responsive to engage with said portions thereof boxes occupying said adjacent intervals, to position said stop, which is between said intervals, in front of the box engaging said first device to halt the advance of said box, said second device, when no longer engaged by a box in said immediately following interval, rendering said stop inoperative to continue to halt said box in said immediately preceding interval.

5. In a conveyor, the combination of: a frame; means on said frame for supporting and propelling boxes along said frame; a series of stops mounted on said frame at spaced intervals therealong, each of said stops being shiftable into obstructing relation with the front face of a box advancing along said conveyor, each of said intervals being equal in length to one of said boxes plus a relatively short distance which it is desired to space adjacent boxes on said conveyor, each of said intervals being hereinafter referred to as a preceding interval with respect to the stop which it immediately precedes, and as a following interval with respect to the stop which it immediately follows; two co-ordinate stop shifting devices for each of said stops, one of said devices being disposed for engagement by a box in the interval preceding said stop and the other of said devices being disposed for engagement by a box in the interval following said stop, said devices, when both are so engaged, cooperating in interposing said stop in the path of the box in said interval preceding said stop, said device engaged by a box in said following interval being operative when disengaged thereby to cause said stop to discontinue obstructing said box in said preceding interval and permit the latter to resume its advance along said conveyor, said two devices in each interval being actuated by a box which has been halted in said interval by the stop which said interval precedes, said two devices continuing to be so actuated as long as said box remains so halted; and a series of shafts mounted on said frame transversely of the latter, one of said shafts being disposed in each of said intervals between said stops, each of said shafts having mounted thereon for rotation about the axis thereof, one of the co-ordinate stop shifting devices of the stop relative to which the interval containing said shaft is the following interval, and also one of the stop shifting devices for the stop relative to which said interval is the preceding interval.

6. A combination as in claim 5 in which said stops and said stop shifting devices are duplicated in spaced relation on opposite sides of the longitudinal axis of the conveyor so that when the advance of the box on said conveyor is halted, it is accomplished by a transversely spaced pair of stops positioned by said stop shifting devices to obstruct the advance of said box.

7. An article stop and release mechanism for a conveyor advancing articles along a predetermined path of travel, comprising a stop disposed adjacent said conveyor out of the path of articles advanced thereby, means actuated by an advancing article on said conveyor for moving said stop into the path of said article, means pivotally mounting said stop on said moving means to permit pivotal movement of said stop out of article arresting position by pressure thereagainst by said article, and a mechanism movably connected with said stop and operable by an article disposed on said conveyor in advance of said stop for preventing pivotal movement of the stop out of article arresting position.

8. An article stop and release mechanism for a conveyor for arresting the travel of articles traveling therealong, comprising a stop, an actuating arm pivotally connected to said stop and extending into the path of travel of the articles on said conveyor, means pivotally mounting said actuating arm on said conveyor whereby upon depression of said arm by an article travelling along said conveyor said stop is projected into the article path, and a stop control mechanism connected to said stop for holding the same in projected position to thereby arrest said article when a preceding article actuates said stop control mechanism.

9. A box stop and release mechanism for a conveyor movably mounted upon a supporting frame for advancing boxes along a predetermined path of travel, comprising a plurality of stop members disposed in longitudinally spaced relation along said conveyor, the space between adjacent stop members being equal to the length of one of said boxes plus a relatively short distance desired for spacing the boxes on the conveyor, a plurality of levers disposed in longitudinally spaced relation along said conveyor, an intermediate portion of each lever being pivotally connected to said frame, the forward end of each of said levers being pivotally connected to one of said stop members, the opposite end of each lever having a cam surface thereon disposed in the path of and depressible by an advancing box on said conveyor for elevating said one stop member into the path of said advancing box to arrest further advance thereof, a plurality of longitudinally spaced stop member setting fingers each pivotally mounted on said frame between adjacent stop members and having its forward end disposed in the path of advancing boxes on said conveyor, and a plurality of longitudinally spaced link elements each pivotally connected at its forward end to the rear end of one of said setting fingers, the opposite ends of said link elements being respectively pivotally connected to said stop members, whereby pivotal movement of a said setting finger out of the path of the front end of a preceding box advanced by said conveyor moves its attached link element rearwardly to swing said one stop member connected thereto on its pivotal mounting to condition such stop member for a subsequent elevation into arresting engagement with a following box when the cam surface of said pivoted lever connected to said one stop member is engaged and depressed by said following box on the conveyor, movement of said preceding box into a position over said setting finger in advance of said one stop member preventing the latter from being swung on its pivotal mounting out of box arresting position by pressure exerted by said following box until after said preceding box has been moved from its occupied space on said conveyor in front of said one stop member.

10. A box stop and release mechanism for a conveyor movably mounted upon a supporting frame for advancing boxes along a predetermined path of travel, comprising a plurality of pairs of transversely spaced stop members disposed in longitudinally spaced relation along said conveyor, the space between adjacent pairs of stop members being equal to the length of one of said boxes plus a relatively short distance desired for spacing the boxes on the conveyor, a plurality of pairs of transversely spaced levers disposed in longitudinally spaced relation along said conveyor, an intermediate portion of each lever being pivotally connected to said frame, the forward end of each of said levers being pivotally connected to one of said stop members of an associated pair thereof, the opposite end of each lever having a cam surface thereon disposed in the path of and depressible by an advancing box on said conveyor for elevating its said connected stop member into the path of said advancing box to arrest further advance thereof, a plurality of longitudinally spaced pairs of stop member setting fingers each pivotally mounted on said frame between adjacent stop members, the forward ends of each pair of setting fingers being disposed in the path of advancing boxes on said conveyor, and a plurality of longitudinally spaced pairs of link elements respectively pivotally connected at their forward ends to the rear ends of said setting fingers, the opposite ends of each pair of link elements being pivotally connected to a succeeding pair of stop members, whereby pivotal movement of the setting fingers of each pair thereof out of the path of the front end of a preceding box advanced by said conveyor moves the attached link elements rearwardly to swing said succeeding pair of stop members connected thereto on their pivotal mountings to condition said succeeding pair of stop members for a subsequent elevation into arresting engagement with a following box when the cam surfaces of the pivoted levers connected to said succeeding pair of stop members are engaged and depressed by said following box on said conveyor, movement of said preceding box into a position over said pair of setting fingers in advance of said succeeding pair of stop members preventing the latter from being swung on their pivotal mountings out of box arresting position by pressure exerted thereagainst by said following box until after said preceding box has been moved from its occupied space on said conveyor in front of said succeeding pair of stop members.

11. In combination, a support structure, conveying means for moving boxes along said structure, a stop mounted on said structure and movable between a position obstructing the movement of a box on said conveying means to a position removed from said obstructing position, means movable in response to contact by a first box moving along said structure for moving said stop means into position obstructing the movement of said first box, and means connected to said stop means and movable in response to contact by a box ahead of said first box in the direction of box movement for holding said stop in said obstructing position.

12. In combination, conveying means for moving articles along a predetermined path, a pivotally mounted stop member normally disposed in an upright position removed from the path of a first article advanced by said conveying means, actuating means operably connected to said stop member and disposed for actuation by said first article for moving said stop member into the path of said first article, and means connected to said stop member and actuated by a second article moving along said path ahead of said first article in the direction of movement of said articles for holding said stop in article obstructing position.

13. In combination, a support structure, conveying means for moving articles along said structure, a stop member mounted on said structure and operable under the pressure of an advancing article thereagainst from an upright position obstructing the movement of the article to an inclined position removed from said article-obstructing position, means for disposing said stop member in an upright position removed from the path of articles along said structure and means actuated by the next following article on said frame for moving said upright stop member into the path of said next article.

14. In combination, a support structure, conveying means for moving boxes along said structure, a stop member mounted on said structure and normally disposed in a position removed from the path of movement of the boxes on said conveying means, and an actuating member operatively connected to said stop member and arranged to move said stop member in a direction substantially transverse to the path of said boxes into box arresting position, said actuating member being operable by a box moving toward said stop member to move said stop member in response to the contact of said box thereagainst.

15. In combination, a support structure, conveying means for moving boxes along said structure, a stop member, actuating means for moving said stop member into the path of travel of a box on said conveying means, means for pivotally mounting said stop member on said actuating means enabling said stop member to swing out of the path of the boxes on said conveyor when contacted by one of said boxes, and means connected to said stop member and actuated by a box on said conveyor ahead of said one box in the direction of movement of the box for preventing pivotal movement of said stop member out of the path of said one box.

16. In combination, a conveyor, means defining a plurality of box-receiving stations on said conveyor and including a stop member at the discharge end of each station, means responsive to the entrance of a box into a station to actuate the stop member of said station to arrest the movement of the box, and means responsive to the presence of a box in a second station on the discharge side of said first station for locking said stop member in box-arresting position.

17. In combination, a support structure, means for moving a box along said support structure, a stop member movable between a position obstructing the path of movement of said box to a position removed from said path obstructing position, actuating means responsive to the weight of an advancing box to move said stop member into said obstructing position, said stop member being movable to said removed position by the contact of said box thereagainst, said box being movable into contact with said stop member while the actuating means is under the influence of the weight of the box.

18. In combination, a support structure, means for moving a box along said support structure, a stop member movable between a position obstructing the movement of said box to a position removed from said obstructing position, actuating means movable in response to contact by said advancing box for moving said stop member into box obstructing position, said stop member being movable to said removed position by the contact of said box thereagainst, resisting means connected to said stop member and movable in response to contact with a box ahead of said advancing box for holding said stop member in said obstructing position, said advancing box being movable against said stop member to move it to said removed position while still in contact with said actuating means whereby the tendency of said advancing box to override said stop member is resisted by the combined action of said preceding box and said advancing box.

19. In combination with a conveyor having a plurality of article receiving stations and means for progressing articles on the conveyor successively into the stations, a stop mechanism for arresting advance of an article in one of the stations comprising two arms interconnected for pivotal movement with respect to each other and extending in substantially opposite directions, means adjacent said one station pivotally supporting one of said arms, means spaced from said one station and adjacent another of said stations pivotally supporting the other of said arms, a stop member supported from said arms for movement into and out of the path of articles on the conveyor, and means connected to one of said arms and extending into the path of articles on the conveyor for moving said levers and stop member upon engagement of the lever moving means by an article in said other station.

20. In combination with a conveyor having a plurality of article receiving stations and means for progressing articles on the conveyor successively into the stations, a stop mechanism for arresting advance of an article in one of the stations comprising two arms interconnected for pivotal movement with respect to each other and extending in substantially opposite directions, means adjacent said one station pivotally supporting one of said arms, means spaced from said one station and adjacent another of said stations pivotally supporting the other of said arms, a stop member supported from said arms for movement into and out of the path of articles on the conveyor, and means for moving said arms.

References Cited in the file of this patent

UNITED STATES PATENTS

| | | |
|---|---|---|
| 1,490,076 | Luce | Apr. 8, 1924 |
| 1,736,092 | Rivera | Nov. 19, 1929 |
| 1,918,537 | Hageline | July 18, 1933 |